US011835649B2

(12) United States Patent
Kim

(10) Patent No.: US 11,835,649 B2
(45) Date of Patent: Dec. 5, 2023

(54) METHOD AND APPARATUS FOR RADAR SIGNAL PROCESSING USING CONVOLUTIONAL NEURAL NETWORK

(71) Applicant: SMART RADAR SYSTEM, INC., Seongnam-si (KR)

(72) Inventor: Jong Il Kim, Yongin-si (KR)

(73) Assignee: SMART RADAR SYSTEM, INC., Seongnam-si (KR)

( * ) Notice: Subject to any disclaimer, the term of this patent is extended or adjusted under 35 U.S.C. 154(b) by 326 days.

(21) Appl. No.: 16/457,834

(22) Filed: Jun. 28, 2019

(65) Prior Publication Data
US 2020/0408880 A1    Dec. 31, 2020

(51) Int. Cl.
*G01S 7/41* (2006.01)
*G01S 7/35* (2006.01)
*G01S 13/34* (2006.01)
*G01S 13/58* (2006.01)

(52) U.S. Cl.
CPC .............. *G01S 7/417* (2013.01); *G01S 7/352* (2013.01); *G01S 7/356* (2021.05); *G01S 13/345* (2013.01); *G01S 13/584* (2013.01)

(58) Field of Classification Search
CPC ........... G01S 7/417; G01S 7/352; G01S 7/356
See application file for complete search history.

(56) References Cited

U.S. PATENT DOCUMENTS

| 6,366,236 | B1 | 4/2002 | Farmer et al. | |
|---|---|---|---|---|
| 11,125,869 | B2* | 9/2021 | Santra | G01S 13/582 |
| 2012/0176267 | A1* | 7/2012 | Nanami | G01S 7/2927 |
| | | | | 342/107 |
| 2015/0226848 | A1 | 8/2015 | Park | |
| 2019/0146497 | A1* | 5/2019 | Urtasun | G06V 10/82 |
| | | | | 701/27 |
| 2019/0362162 | A1* | 11/2019 | Averbuch | G06F 16/2365 |
| 2020/0292660 | A1* | 9/2020 | Meissner | G01S 7/417 |
| 2020/0371524 | A1* | 11/2020 | Parchami | G06V 20/54 |
| 2021/0190903 | A1* | 6/2021 | Kageme | G01S 13/06 |

FOREIGN PATENT DOCUMENTS

| JP | 10-239427 A | 9/1998 |
|---|---|---|
| JP | 10-239428 A | 9/1998 |
| JP | 2003-507716 A | 2/2003 |
| KR | 10-2014-0120593 A | 10/2014 |
| KR | 10-2016-0054349 A | 5/2016 |
| KR | 10-2017-0068948 A | 6/2017 |

* cited by examiner

*Primary Examiner* — Timothy A Brainard
*Assistant Examiner* — Ismaaeel A. Siddiquee
(74) *Attorney, Agent, or Firm* — INSIGHT LAW GROUP, PLLC; Seung Lee

(57) ABSTRACT

Two-dimensional data obtained by performing a Fourier transform on a digitally converted FMCW radar signal at every pulse repetition interval over N pulse repetition intervals is input to a convolutional neural network (CNN) to find the probabilities of the existence of a target in range indices. The range indices, i.e., bit frequencies are selected based on the probabilities of the existence of the target. In order to reduce the size of the CNN, windowing is applied to the two-dimensional data. A speed-index-specific coefficient value may be calculated by re-performing a Fourier transform on range data for the selected bit frequencies. Thus, the range and speed of the target may be calculated.

15 Claims, 4 Drawing Sheets

METHOD AND APPARATUS FOR RADAR SIGNAL PROCESSING USING CONVOLUTIONAL NEURAL NETWORK

BACKGROUND

1. Field

The following description relates to a technique for processing signals received from a radar.

2. Description of Related Art

For example, a signal processing technique for a frequency modulated continuous wave (FMCW) radar such as that disclosed in U.S. Patent Publication No. US2015/0226848A1 is known. Range data, which indicates range-index-specific coefficient values, is calculated by performing a digital conversion on reflected waves reflected from a target and received through a reception antenna and then performing a fast Fourier transform (FFT) at every pulse repetition interval (PRI). Data obtained by performing an FFT over N PRIs is stored in a memory. Subsequently, speed-index-specific coefficient values are calculated by performing the second FFT on the stored data for each range index and then are stored in the memory. Among range-speed-index-specific coefficient values stored in the memory, coefficient values that are likely to be targets are selected through constant false alarm rate (CFAR) detection. Subsequently, the speeds and ranges of the selected targets may be output.

Here, the CFAR detection includes applying a variable detection threshold in the presence of noise and clutter to maintain a false alarm rate at a constant level, removing the noise and the clutter, and then selecting a meaningful bit frequency. Cell-Averaging CFAR (CA-CFAR), Order Statistics-CFAR (OSO-CFAR), and the like are well known depending on the selection method for the detection threshold. Depending on the detection threshold, detection failure or overdetection may occur. However, it is still difficult to set the detection threshold appropriately according to various environmental conditions.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to the raising of the reliability of detecting targets in radar signals. Furthermore, the following description relates to the simplifying of a radar signal processing algorithm.

In one general aspect, two-dimensional data obtained by performing a Fourier transform on a digitally converted frequency modulated continuous wave (FMCW) radar signal at every pulse repetition interval over N pulse repetition intervals (PRIs) is input to a convolutional neural network (CNN) to find the probabilities of the existence of a target in range indices. The range indices, i.e., bit frequencies are selected based on the probability of the existence of the target. In order to reduce the size of the CNN, windowing is applied to the two-dimensional data.

In another general aspect, a speed-index-specific coefficient value is calculated by re-performing a Fourier transform on range data corresponding to the selected bit frequencies. Thus, the range and speed of the target may be calculated.

Other features and aspects will be apparent from the following detailed description, the drawings, and the claims.

Figure 1:
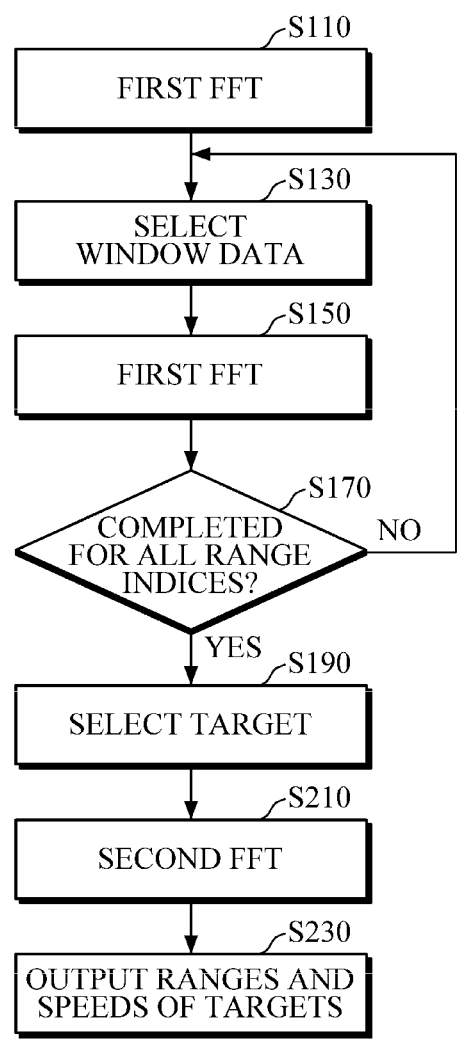
FIG. 1 is a flowchart showing a method for radar signal processing according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The above or other aspects will be implemented through embodiments described with reference to the accompanying drawings. It is to be understood that the components of each embodiment may be variously combined therein unless otherwise stated or mutually contradictory.

Figure 2:
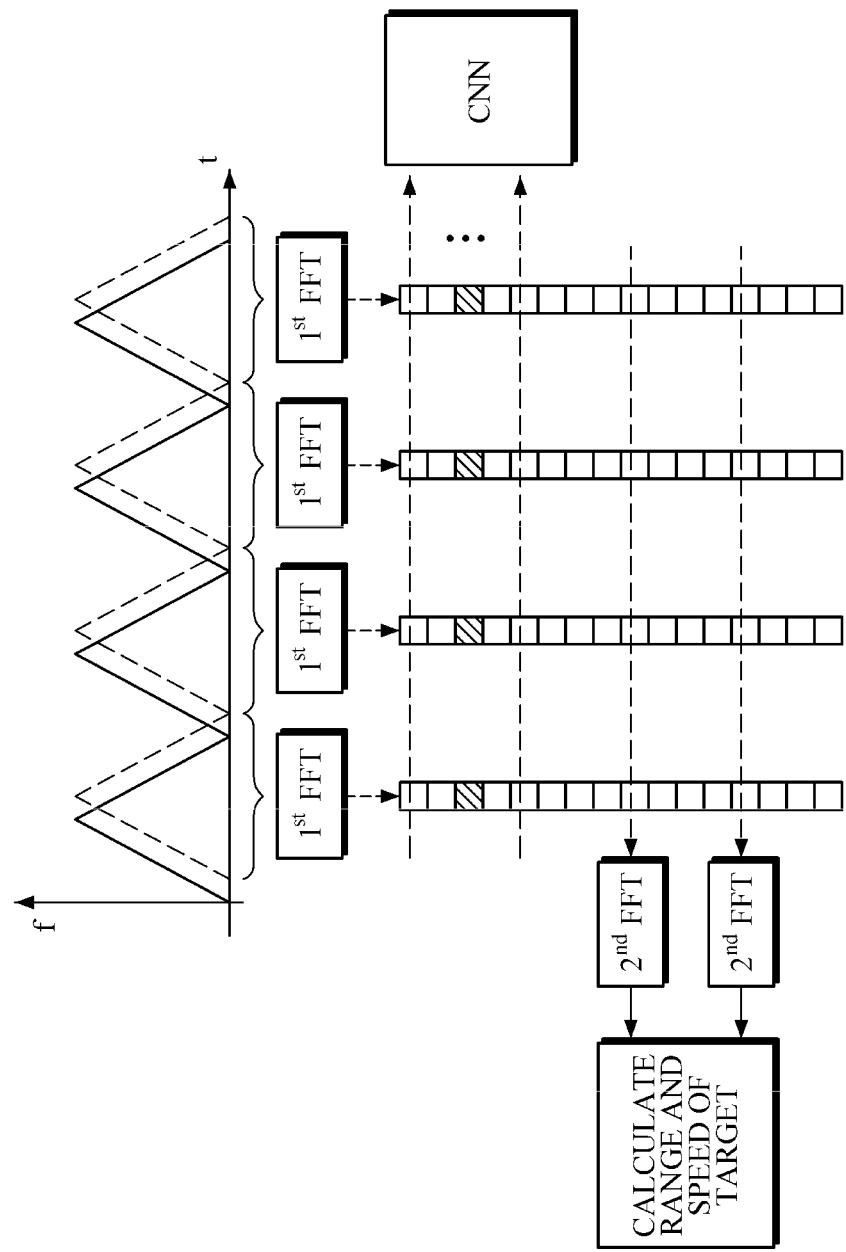
FIG. 2 is a conceptual diagram schematically illustrating the method for the radar signal processing according to an embodiment of the proposed invention.

FIG. 1 is a flowchart showing a method for radar signal processing according to an embodiment. A radar signal received from an antenna is amplified, frequency-synthesized, filtered, and digitally sampled and supplied as a frequency modulated continuous wave (FMCW) digital radar signal according to the proposed invention. As shown, a Fourier transform is performed on the FMCW digital radar signal including N pulse repetition intervals (PRIs) at every PRI to generate range data, which indicates range-index-specific coefficient values (S110). FIG. 2 is a conceptual diagram schematically illustrating the method for the radar signal processing according to an embodiment of the proposed invention. In the time-frequency graph, a solid line indicates a radar signal transmitted through a transmission antenna, and a dotted line indicates a radar signal received through a reception antenna. When the pulse repetition interval, which is called a chirp, is referred to as PRI and the sampling frequency is referred to as fs, the number of samples for each pulse repetition interval is PRI×fs. M coefficient values are generated through an M-point FFT with PRI×fs inputs. The coefficient values obtained by performing a Fourier transform are referred to as "range data" in the sense that they include range information.

Figure 3:
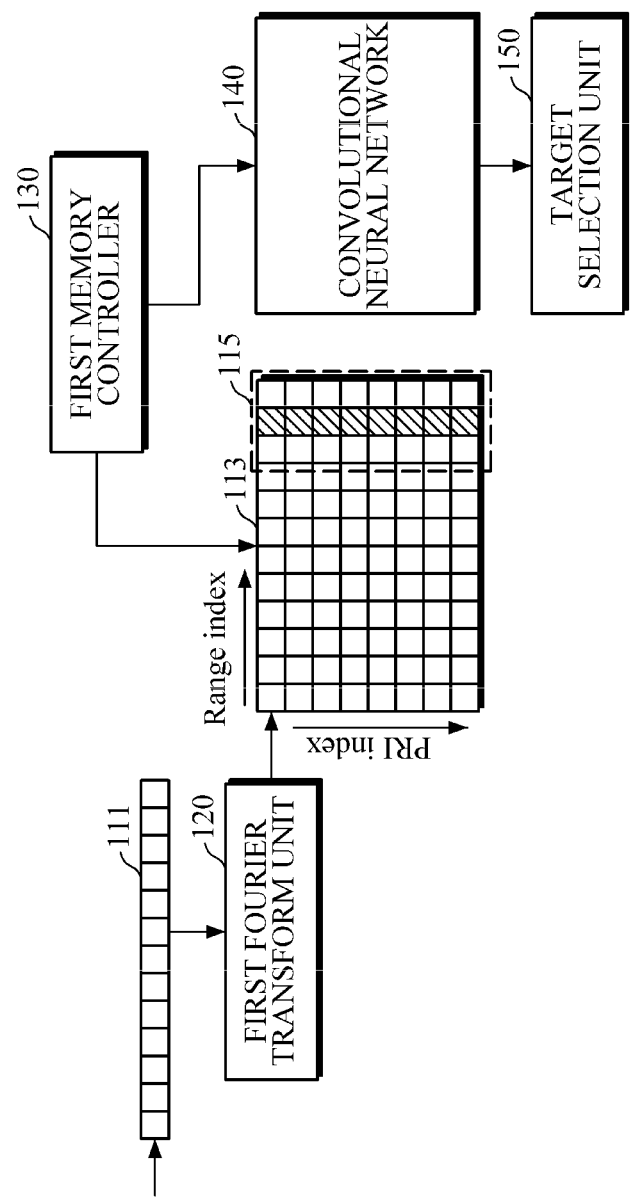
FIG. 3 is a block diagram showing a configuration of an apparatus for radar signal processing according to an embodiment.

Subsequently, two-dimensional window data obtained by accumulating one-dimensional data consisting of a range index of interest and range data corresponding to nearby range indices on the time axis of the PRI is selected (S130). A second-dimensional window may consist of a range index of interest and range data corresponding to W nearby range indices present on each of the left and right sides of the range index of interest. In the embodiment of FIG. 3, range data corresponding to two range indices present on each of the left and right sides of the coefficient values of the hatched range indices of interest is windowed. The two-dimensional window data is set to also consider data of its nearby range indices in order to determine whether the data of the range index of interest is targeted.

The range 2W of the nearby range indices included in the two-dimensional window may be determined appropriately in consideration of the amount of computation. When W is increased, accuracy is improved, but the amount of computation increases. If W increases to a certain level, there is no change in performance, so the appropriate size is determined.

Subsequently, the selected window data is input to a convolutional neural network (CNN) to find the probability of the existence of a target in the range index of interest (S150). Generally, the CNN is configured to extract a convolution feature from an image through convolution with a filter and perform classification using the extracted convolution feature. The CNN is mainly applied to image processing. According to the proposed invention, it was found that the reliability of target identification is improved compared to the conventional constant false alarm rate (CFAR) by performing a Fourier transform on an FMCW digital radar signal at every PRI and then processing data which is two-dimensionally arranged for N PRIs by means of the CNN. The inventor speculates that this result is achieved because two-dimensional bit frequency data has similar characteristics to those of the image.

Subsequently, the operations S130 and S150 are repeated for data of all the range indices (S170). This process may be performed by sequentially supplying the window data to one CNN processing module, by supplying the window data in parallel to M CNN processing modules that are learned in the same manner, or by sequentially supplying P pieces of window data to each of M/P CNN processing modules that are learned in the same manner. To this end, the CNN processing module is prepared through the learning of the two-dimensional window including the range index of interest among the range data obtained by performing a Fourier transform during N periods and through the learning of data on whether the target exists in the range index of interest.

Subsequently, the range index in which the target exists is selected based on the probabilities of the existence of the target in the range indices (S190). In an embodiment, a range index having a target existence probability of 80% or higher is selected as the range index in which the target exists.

According to another aspect of the proposed invention, the method for the radar signal processing according to an embodiment may further include a second Fourier transform operation (S210) in which a Fourier transform is performed on range data of the range index in which the target exists to calculate a speed-index-specific coefficient value and an output operation (S230) in which ranges and speeds of selected targets are output. FIG. 2 shows an example in which the ranges and speeds of two selected targets are computed.

Fourier coefficient values obtained by performing the $2^{nd}$ FFT on the output coefficient values of the $1^{st}$ FFT in the direction of the PRI index, that is, in the direction of the time axis are referred to as "speed index"-specific coefficient values in the sense that they include speed information. Computations by an FMCW radar to find the range and speed from a bit frequency are well known, and a detailed description thereof will be omitted.

FIG. 3 is a block diagram showing a configuration of an apparatus for radar signal processing according to an embodiment. As shown, the apparatus for the radar signal processing according to an embodiment includes a first Fourier transform unit 120, a transform memory 113, a CNN 140, a first memory controller 130, and a target selection unit 150. A radar signal received through an antenna is amplified, frequency-synthesized, filtered, digitally sampled, and supplied to the apparatus for the radar signal processing according to the proposed invention. Herein, this signal is referred to as an FMCW digital radar signal.

The first Fourier transform unit 120 performs a Fourier transform on an FMCW digital radar signal at every PRI to generate range data, which indicates range-index-specific coefficient values. In the shown embodiment, a fast Fourier transform (FFT) is used as the Fourier transform. When a pulse repetition interval, which is called a chirp, is referred to as PRI and a sampling frequency is referred to as fs, the number of samples per pulse repetition interval is PRI×fs. Accordingly, a buffer memory 111 has a size of PRI×fs. When M frequency component coefficient values are found through an M-point Fourier transform, the range index in FIG. 3 has a value ranging from 1 to M. The coefficient values obtained by the first Fourier transform unit 120 performing a Fourier transform is referred to as "range data" in the sense that they include range information. The range data obtained by performing a Fourier transform during N PRIs is stored in the transform memory 113. In the shown embodiment, the transform memory has a size of M×N. In order to process a real part and an imaginary part, the transform memory 113 includes two memory blocks, each of which has a size of M×N.

The convolutional neural network (CNN) 140 receives two-dimensional window data obtained by accumulating, on the time axis of the PRI, one-dimensional data consisting of a range index of interest and range data corresponding to a nearby range index and finds the probability of the existence of the target in the range index of interest. Generally, the CNN is configured to extract a convolution feature from an image through convolution with a filter and perform classification using the extracted convolution feature. The CNN is mainly applied to image processing. According to the proposed invention, it was found that the reliability of target identification is improved compared to the conventional CFAR by performing a Fourier transform on an FMCW digital radar signal at every PRI and then processing data which is two-dimensionally arranged for N PRIs by means of the CNN. The inventor speculates that this result is achieved because two-dimensional bit frequency data has similar characteristics to those of the image.

A two-dimensional window may consist of a range index of interest and range data corresponding to W nearby range indices arranged on each of the left and right sides. In the shown embodiment, a two-dimensional window 115 shown in dotted lines consists of a hatched range index of interest and range data corresponding to one range index on each of the left and right sides. However, W may have a value of 1, 2, 3, . . . , and the two-dimensional window may include a range index of interest and range data corresponding to any number of nearby range indices arranged on each of the left and right sides. As W increases, the accuracy is enhanced to some extent, but the amount of computation increases. When W increases to a certain level, the amount of computation increases, but there is no change in performance.

Thus, a value having an appropriate size is determined. The CNN 140 receives the two-dimensional window data and outputs the probability of the existence of the target in the range index of interest that is centrally arranged.

To this end, the CNN 140 is prepared through the learning of the two-dimensional window including the range index of interest of the range data obtained by performing a Fourier transform at N periods and also through the learning of data on whether the target exists in the range index of interest. The first memory controller 130 provides the range data stored in the transform memory 113 to the CNN in units of the two-dimensional window. In the shown embodiment, the first memory controller 130 includes a direct memory access (DMA) controller. The first memory controller 130 inputs a start address and a block size of the two-dimensional window 115 to the DMA controller, inputs a start address of an input buffer of the CNN 140, and then initiates a DMA cycle. When the first processing for the two-dimensional window is completed, the two-dimensional window moves to the next range index of interest. This process is repeated for all the range indices, that is, for the range indices #1 to #M.

According to still another embodiment, the CNN 140 may include M unit CNNs, each of which may process the range data of the two-dimensional window (here, M is equal to the number of range indices). The transform memory 113 consists of unit memories, each of which is independently accessible for a corresponding range index. A data bus is prepared so that data from one unit memory is provided to a number of adjacent unit CNNs, the number corresponding to the width of the two-dimensional window. The first memory controller 130 performs control such that the range data of the two-dimensional window of the transform memory 113 is provided to M CNNs at the same time.

The target selection unit 150 selects a range index in which a target exists on the basis of the probabilities of the existence of the target in the range indices calculated by the CNN 140. In an embodiment, the target selection unit 150 selects and outputs a range index having a target existence probability of 80% or higher.

Figure 4:
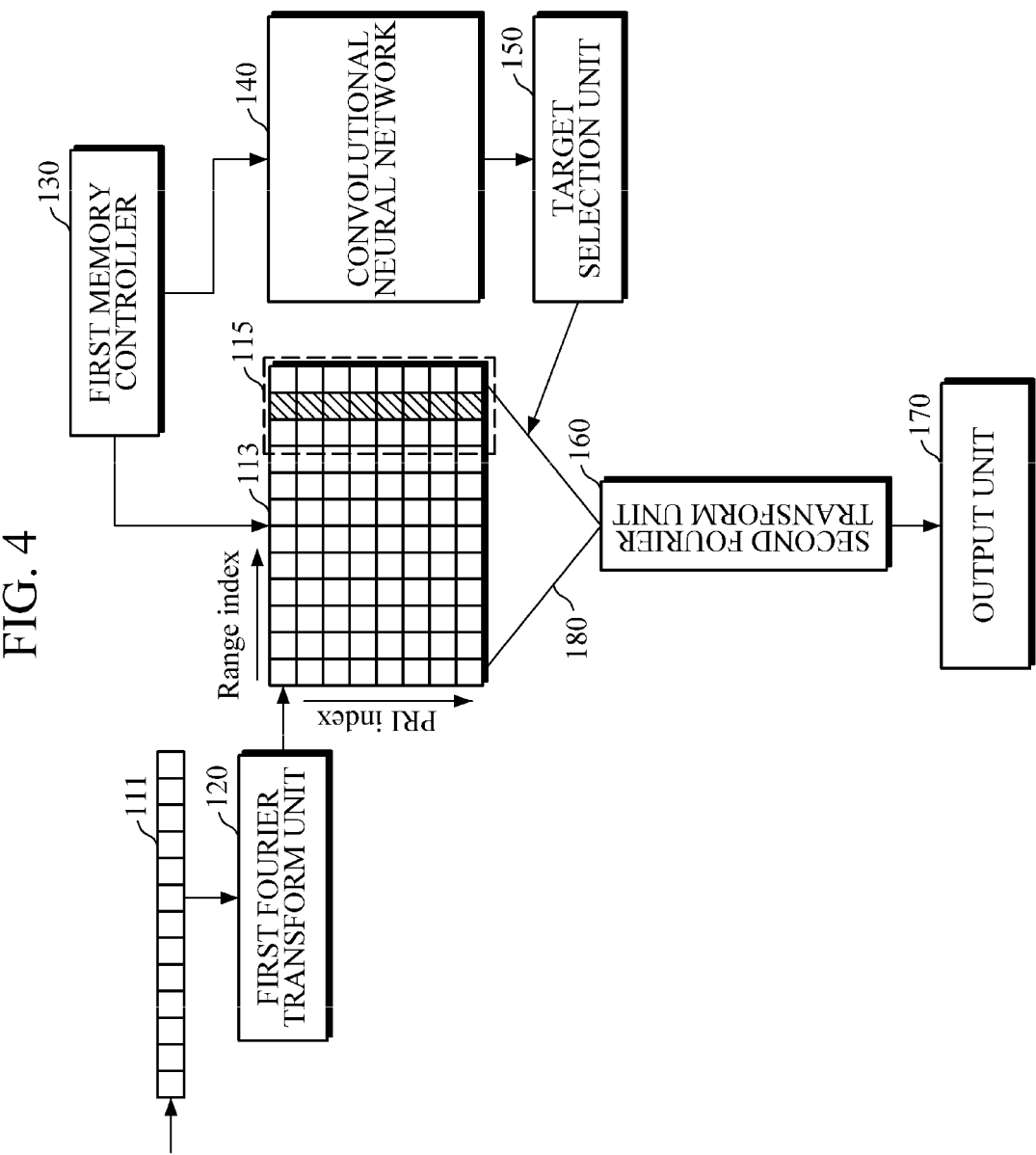
FIG. 4 is a block diagram showing a configuration of an apparatus for radar signal processing according to another embodiment.

According to still another aspect, the apparatus for the radar signal processing may perform a Fourier transform on the range data in which the target is determined as existing and may provide speed information. Since a Fourier transform is performed on only the range data in which the target is determined as existing, it is possible to reduce the number of Fourier transforms and the amount of computation. FIG. 4 is a block diagram showing a configuration of an apparatus for radar signal processing according to another embodiment in which such an aspect is implemented. In the shown embodiment, the elements referred to by the same reference numerals as those shown in FIG. 3 have similar configurations, and thus a detailed description thereof will be omitted.

As shown, the apparatus for the radar signal processing may further include a second Fourier transform unit 160, a second memory controller 180, and an output unit 170. The second Fourier transform unit 160 performs a Fourier transform on range data having the same range index and calculates a speed-index-specific coefficient value. In the shown embodiment, the second Fourier transform unit 160 is an FFT transformer. Coefficient values obtained by re-performing a Fourier transform on Fourier coefficients obtained through transformation by the first Fourier transform unit 120 in the direction of the PRI index, that is, in the direction of the time axis are referred to as "speed index"-specific coefficient values in the sense that they include speed information. The second memory controller 180 provides range data of the range index selected by the target selection unit 150 to the second Fourier transform unit 160. The output unit 170 calculates and outputs range and speed information of targets selected based on the outputs of the second Fourier transform unit. Computations by an FMCW radar to find the range and speed from a bit frequency are well known, and a detailed description thereof will be omitted.

According to the proposed invention, it is possible to confirm, through simulation, that detection failure or over-detection is efficiently avoided during FMCW radar signal processing. Also, compared to the conventional method, a method capable of reducing circuit complexity and also the amount of computation is proposed.

The present invention has been described above with reference to embodiments referring to the accompanying drawings, but is not limited thereto. Rather, the present invention should be construed as encompassing various modifications that may be apparent to those skilled in the art. The following claims are intended to cover the modifications.

What is claimed is:

1. A method for radar signal processing, the method comprising:
   a first Fourier transform operation to perform a Fourier transform on a frequency modulated continuous wave (FMCW) digital radar signal including N pulse repetition intervals (PRIs) at every PRI to generate range data, which indicates range-index-specific coefficient values;
   a convolutional neural network (CNN) processing operation to input two-dimensional window data obtained by accumulating one-dimensional data consisting of a range index of interest and range data corresponding to a nearby range index on a time axis of the PRI to a CNN circuit and to output, from the CNN circuit, a probability of an existence of a target in the range index of interest;
   a target selection operation to select first range indices each having a target existence probability equal to or higher than a predetermined value among the range indices, wherein the range indices further comprise second range indices each having a target existence probability lower than the predetermined value;
   a second Fourier transform operation to perform a Fourier transform on range data of the first range indices, selected by the target selection operation, each having a target existence probability equal to or higher than the predetermined value, wherein the second Fourier transform operation is not performed for the second range indices each having a target existence probability lower than the predetermined value; and
   an output operation to output ranges and speeds of selected targets.

2. The method of claim 1, further comprising:
   a repetition operation to repeat the CNN processing operation for all the range indices.

3. The method of claim 1, wherein the CNN operation is performed subsequent to the first Fourier transform operation, the target selection operation is performed subsequent to the CNN operation, and the second Fourier transform operation is performed subsequent to the target selection operation.

4. The method of claim 1, wherein at least some among all the range indices are not selected by the target selection operation.

5. The method of claim 1, wherein the predetermined value is 80 percent.

6. An apparatus for radar signal processing, the apparatus comprising:
a processor, and
a memory,
wherein the processor, when executing program instructions stored in the memory, is configured to:
perform a first Fourier transform operation to perform a Fourier transform on a frequency modulated continuous wave (FMCVV) digital radar signal including N pulse repetition interval (PRI) at every PRI to generate range data, which indicates range-index-specific coefficient values;
to perform a convolutional neural network (CNN) processing operation to input two-dimensional window data obtained by accumulating one-dimensional data consisting of a range index of interest and range data corresponding to a nearby range index on a time axis of the PRI to a CNN circuit and to output, from the CNN circuit, a probability of an existence of a target in the range index of interest and
to perform a target selection operation to select first range indices each having a target existence probability equal to or higher than a predetermined value among the range indices, wherein the range indices further comprise second range indices each having a target existence probability lower than the predetermined value;
to perform a second Fourier transform operation to perform a Fourier transform on range data of the first range indices, selected by the target selection operation, each having a target existence probability equal to or higher than the predetermined value, wherein the second Fourier transform operation is not performed for the second range indices each having a target existence probability lower than the predetermined value; and
to perform an output operation to output ranges and speeds of selected targets.

7. The apparatus of claim 6, wherein the processor is further configured to:
perform a repetition operation to repeat the CNN processing operation for all the range indices.

8. The apparatus of claim 6, wherein the CNN operation is performed subsequent to the first Fourier transform operation, the target selection operation is performed subsequent to the CNN operation, and the second Fourier transform operation is performed subsequent to the target selection operation.

9. The apparatus of claim 6, wherein at least some among all the range indices are not selected by the target selection operation.

10. The apparatus of claim 6, wherein the predetermined value is 80 percent.

11. An apparatus for radar signal processing, the apparatus comprising:
a processor, and
a memory,
wherein the processor, when executing program instructions stored in the memory, is configured to:
perform a first Fourier transform operation to perform a Fourier transform on a frequency modulated continuous wave (FMCVV) digital radar signal including N pulse repetition interval (PRI) at every PRI to generate range data, which indicates range-index-specific coefficient values;
to perform a convolutional neural network (CNN) processing operation to input two-dimensional window data obtained by accumulating one-dimensional data consisting of a range index of interest and range data corresponding to a nearby range index on a time axis of the PRI to a CNN circuit and to output, from the CNN circuit, a probability of an existence of a target in the range index of interest and
to perform a target selection operation to select first range indices each having a target existence probability equal to or higher than a predetermined value among the range indices, wherein the range indices further comprise second range indices each having a target existence probability lower than the predetermined value;
to perform a second Fourier transform operation to perform a Fourier transform only on range data of the first range indices, selected by the target selection operation, each having a target existence probability equal to or higher than the predetermined value; and
to perform an output operation to output ranges and speeds of selected targets.

12. The apparatus of claim 11, wherein the processor is further configured to:
perform a repetition operation to repeat the CNN processing operation for all the range indices.

13. The apparatus of claim 11, wherein the CNN operation is performed subsequent to the first Fourier transform operation, the target selection operation is performed subsequent to the CNN operation, and the second Fourier transform operation is performed subsequent to the target selection operation.

14. The apparatus of claim 11, wherein at least some among all the range indices are not selected by the target selection operation.

15. The apparatus of claim 11, wherein the predetermined value is 80 percent.

* * * * *